(12) United States Patent
Lentine et al.

(10) Patent No.: US 9,143,053 B1
(45) Date of Patent: Sep. 22, 2015

(54) MICROINVERTERS FOR EMPLOYMENT IN CONNECTION WITH PHOTOVOLTAIC MODULES

(71) Applicants: Sandia Corporation, Albuquerque, NM (US); The Board of Trustees of the University of Illinois, Urbana, IL (US)

(72) Inventors: Anthony L. Lentine, Albuquerque, NM (US); Gregory N. Nielson, Albuquerque, NM (US); Murat Okandan, Edgewood, NM (US); Brian Benjamin Johnson, Champaign, IL (US); Philip T. Krein, Champaign, IL (US)

(73) Assignees: Sandia Corporation, Albuquerque, NM (US); The Board of Trustees of the University of Illinois, Urbana, IL (US)

( * ) Notice: Subject to any disclaimer, the term of this patent is extended or adjusted under 35 U.S.C. 154(b) by 492 days.

(21) Appl. No.: 13/741,546

(22) Filed: Jan. 15, 2013

Related U.S. Application Data

(63) Continuation-in-part of application No. 13/543,297, filed on Jul. 6, 2012, now Pat. No. 9,093,586, which is a continuation-in-part of application No. 12/914,441, filed on Oct. 28, 2010, now Pat. No. 9,029,681, which is a continuation-in-part of application No. 11/933,458, filed on Nov. 1, 2007.

(60) Provisional application No. 61/594,776, filed on Feb. 3, 2012.

(51) Int. Cl.
*H02J 1/10* (2006.01)
*H02M 7/537* (2006.01)

(52) U.S. Cl.
CPC .................................... *H02M 7/537* (2013.01)

(58) Field of Classification Search
CPC ..................................................... H02M 7/537
USPC .......................................................... 307/43
See application file for complete search history.

(56) References Cited

U.S. PATENT DOCUMENTS 8,526,205 B2 * 9/2013 Garrity ............................ 363/37
8,736,108 B1 * 5/2014 Nielson et al. .................. 307/43
9,029,681 B1 * 5/2015 Nielson et al. ................ 136/246

* cited by examiner

*Primary Examiner* — Hal Kaplan
(74) *Attorney, Agent, or Firm* — Medley, Behrens & Lewis, LLC (57) ABSTRACT

Microinverters useable in association with photovoltaic modules are described. A three phase-microinverter receives direct current output generated by a microsystems-enabled photovoltaic cell and converts such direct current output into three-phase alternating current out. The three-phase microinverter is interleaved with other three-phase-microinverters, wherein such microinverters are integrated in a photovoltaic module with the microsystems-enabled photovoltaic cell.

20 Claims, 7 Drawing Sheets

MICROINVERTERS FOR EMPLOYMENT IN CONNECTION WITH PHOTOVOLTAIC MODULES

RELATED APPLICATIONS

This application claims priority to U.S. Provisional Patent Application No. 61/594,776, filed on Feb. 3, 2012, and entitled "PARALLEL INTERLEAVED INVERTERS". This application is additionally a continuation-in-part of U.S. patent application Ser. No. 13/543,297, filed on Jul. 6, 2012, and entitled "PHOTOVOLTAIC POWER GENERATION SYSTEM FREE OF BYPASS DIODES", which is a continuation-in-part U.S. patent application Ser. No. 12/914,441, filed on Oct. 28, 2010, which is a continuation-in-part of U.S. patent application Ser. No. 11/933,458, filed on Nov. 1, 2007. The entireties of these applications are incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Environmental concerns pertaining to utilization of fossil fuels to generate electric power, together with the non-renewable nature of such fossil fuels, have increased demand for alternative energy sources. Exemplary electric power systems that utilize renewable energy resources include solar power systems, wind power systems, hydroelectric power systems, geothermal power systems, amongst others.

Conventional solar power systems, particularly those utilized to provide electric power to a residence, include solar panels that comprise a plurality of relatively large silicon photovoltaic cells (e.g., approximately six inches by six inches). For instance, a single solar panel can include approximately 72 cells. The solar cells are manufactured to output a certain voltage (e.g., 0.6 V for silicon cells) that is approximately constant regardless of an amount of solar radiation received at the solar cells. Additionally, the solar cells are electrically connected in series within a solar panel, such that the solar panel produces approximately 40 V. A typical residential solar system includes several solar panels (e.g., between 5 and 10), and the panels are electrically connected in series, thereby resulting in several hundred cells being electrically connected in series that collectively output a voltage that is approximately equal to the sum of the voltages of the individual cells.

In typical solar power system installations, the series connected cells are coupled to an inverter that converts direct current output by the solar power installation into alternating current suitable for provision to the electric grid. Generally, because power produced by the photovoltaic system is relatively high, the inverter tends to be relatively sizable and costly, due at least in part to a large capacitance needed in a DC link that couples the solar power system to the inverter, as well as the relatively large inductance required on an output leg of the inverter for purposes of filtering. Moreover, such inverters are generally sold separately from the solar panels themselves. Thus, to install a solar power system on a residence, the panels themselves must be mounted, wired, inverters must be added, etc., increasing the cost of installing the solar power system.

SUMMARY

The following is a brief summary of subject matter that is described in greater detail herein. This summary is not intended to be limiting as to the scope of the claims.

Described herein are various technologies pertaining to microinverters that can be utilized in connection with photovoltaic modules that include solar cells. In an exemplary embodiment, such solar cells can be microsystems-enabled photovoltaic (MEPV) cells, although the invention is not so limited. MEPV cells are photovoltaic cells manufactured utilizing semiconductor manufacturing techniques, and tend to be relatively small, with diameters, for instance, between 100 μm and 5 mm, with thicknesses between 1 μm and 1000 μm. Pursuant to an exemplary embodiment, a photovoltaic module includes at least one MEPV cell that is electrically connected to a three-phase microinverter. The microinverter can include a DC link with a capacitance of between 100 nF and 1 μF. It is to be understood, however, that in other embodiments, the DC link can have a larger capacitance, such as between 1 μF and 5 μF or more. Additionally, the inverter can comprise three phase legs, wherein inductance of each of the three phase legs can be between 4 mH and 10 mH. It is to be understood that the inductance is dependent upon switching frequency; as the switching frequency increases, an amount of inductance decreases. In an exemplary embodiment, the three-phase microinverter can be included in an apparatus that is physically separate from the photovoltaic module. In another exemplary embodiment, the three-phase microinverter can be integrated into the photovoltaic module, such that the MEPV cell and the three-phase microinverter reside on a common substrate. Thus, the three-phase microinverter can be an integrated circuit.

Further, a photovoltaic module can include numerous sub-modules that are connected in series, wherein each string of sub-modules can have a respective three-phase microinverter electrically connected thereto. These three-phase microinverters can be electrically connected in parallel.

Pursuant to another example, a photovoltaic module can be associated with a plurality of interleaved microinverters that are electrically connected in parallel with one another. In such an embodiment, the microinverters can be single-phase, three-phase, or any poly-phase microinverters. Again, pursuant to an example, such microinverters can be integrated into the photovoltaic module. As the photovoltaic module comprises a plurality of interleaved microinverters, power rating of such microinverters can be relatively small. For instance, the power-rating of an interleaved microinverter can be between 15 W and 30 W. Additionally, each phase leg of each interleaved microinverter can have in inductance of between 500 pH and 1 mH, although as mentioned above, such inductances can depend upon a switching frequency employed. As is well known to practitioners, the inductance also depends on power rating and specifications for current ripple, and can be implemented with values much different than the range between 500 μH and 1 mH if preferred by the designer.

Other aspects will be appreciated upon reading and understanding the attached figures and description.

DETAILED DESCRIPTION

Various technologies pertaining to associating microinverters with photovoltaic modules that comprise micro-system enabled photovoltaic (MEPV) cells will now be described with reference to the drawings, where like reference numerals represent like elements throughout. Additionally, as used herein, the term "exemplary" is intended to mean serving as an illustration or example of something, and is not intended to indicate a preference.

Figure 1:
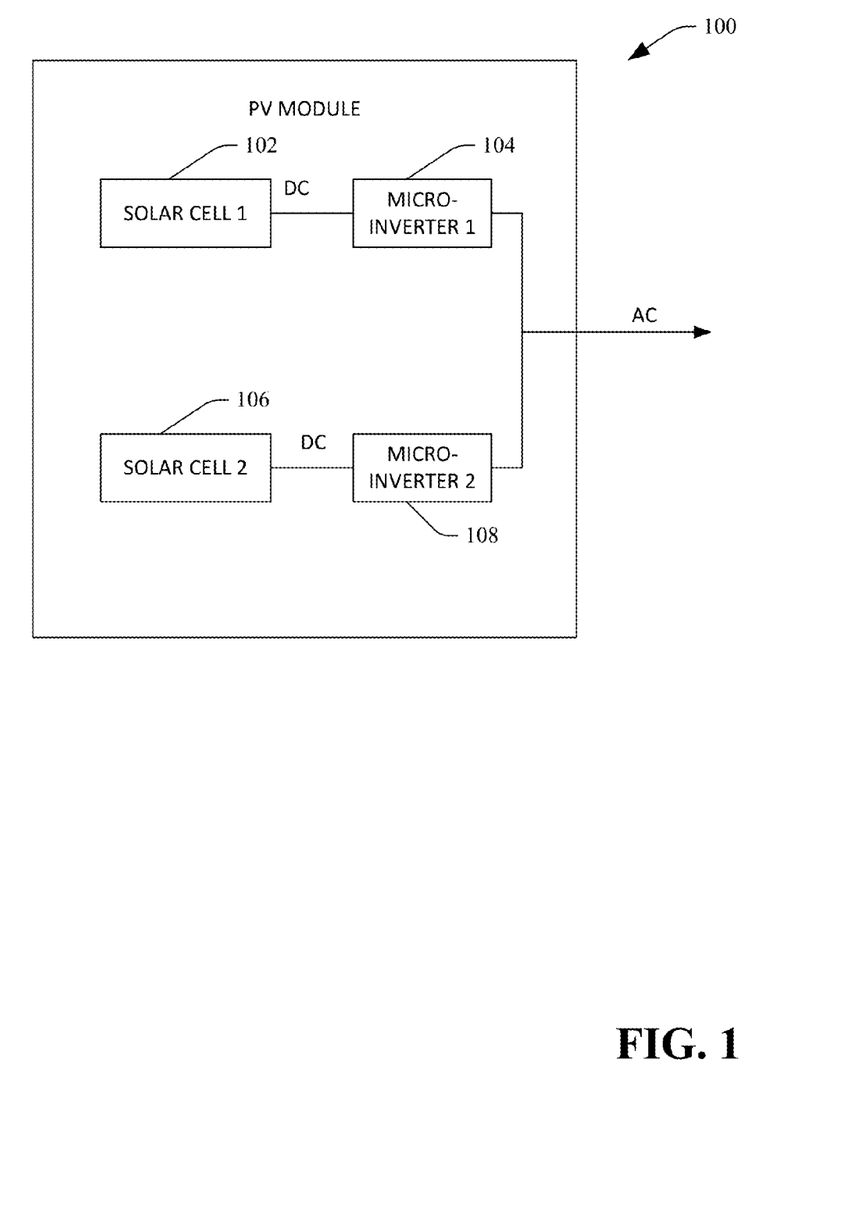
FIG. 1 illustrates an exemplary photovoltaic module and associated microinverters.

With reference now to FIG. 1, an exemplary photovoltaic module 100 is illustrated. The photovoltaic module 100 can be a portion of a solar power system. For example, the photovoltaic module 100 can also be referred to as a solar panel, solar module, or the like.

In an exemplary embodiment, the photovoltaic module 100 can comprise a plurality of MEPV cells that are selectively electrically connected in series and parallel, in a manner described herein, to cause the photovoltaic module 100 to output a desired amount of voltage at a desired amount of current. MEPV cells are manufactured by way of semiconductor manufacturing techniques and are relatively small with diameters of between 100 µm and 5 mm and thicknesses as low as 1 µm for a III-V cell, but potentially as large as 1000 µm. Due to the relatively small size of the MEPV cells, the photovoltaic module 100 can comprise thousands of MEPV cells, in comparison to the 72 cells included in conventional photovoltaic modules.

As shown in FIG. 1, the photovoltaic module can comprise a first solar cell 102. In an exemplary embodiment, the first solar cell 102 can be a MEPV cell. Thus, the first solar cell 102, in an exemplary embodiment, can be a III-V cell, such as a gallium arsenide (GaAs) cell, an indium gallium phosphide (InGaP) cell, or an indium gallium arsenide (InGaAs) cell. In other exemplary embodiments, the first solar cell 102 can be a silicon (Si) cell. In still another embodiment, the first solar cell 102 can be a germanium (Ge) cell. In still another exemplary embodiment, the first solar cell 102 can be a multi-junction cell that comprises a suitable combination of the aforementioned cell types electrically connected in series. In still another example, the first solar cell 102 may be a portion of a multi junction cell that is independently contactable. It is therefore to be understood that the first solar cell 102 can be any suitable type of solar cell or portion of a multi junction solar cell.

Further, while not shown, the first solar cell 102 can be a portion of a string of solar cells connected in series. As will be shown below, such series-connected string of solar cells can be coupled in parallel with other series-connected strings of solar cells. These parallel connections may then be coupled in series with other similarly configured groups of solar cells, such that the photovoltaic module 100 outputs a desired voltage and current. In an exemplary embodiment, operating voltage of the solar cell 102 can be between 0.2 V and 3 V.

Current traveling over the solar cell 102 can be relatively low, such as on the order of milliamps.

The photovoltaic module 100 further comprises a first microinverter 104 that is configured to convert direct current output by the first solar cell 102 to alternating current. In an exemplary embodiment, the first microinverter 104 can be a three-phase microinverter that converts direct current output by the first solar cell 102 to three-phase alternating current. As shown in FIG. 1, the first microinverter 104 can be an integrated circuit that is integrated into the photovoltaic module 100, such that the first microinverter 104 lies on a substrate with the first solar cell 102. In another exemplary embodiment, the first microinverter 104 can be in an apparatus that is separate from the photovoltaic module 100, such that the first microinverter 104 can be implemented as a printed circuit board with discrete circuit elements. Other embodiments are likewise contemplated. The first microinverter 104 thus acts as at least a portion of an interface between the photovoltaic module 100 and the AC grid.

The photovoltaic module 100 can also comprise a second solar cell 106. The second solar cell 106 can likewise be an MEPV cell, and can additionally be any of the cell types mentioned above with respect to the first solar cell 102. Further, it is to be understood that a type of the first solar cell 102 can be different from a type of the second solar cell 106. The photovoltaic module 100 further comprises a second microinverter 108 that is electrically connected to the second solar cell 106. The second microinverter 108 receives direct current output by the second solar cell 106, and in an exemplary embodiment, converts such direct current to three-phase alternating current. As shown, the first microinverter 104 and the second microinverter 108 can be electrically connected in parallel and can collectively act as at least a portion of an interface between the cells of the photovoltaic module 100 and the AC grid. In an exemplary embodiment, the first microinverter 104 and the second microinverter 108 can be integrated in the photovoltaic module 100. In other embodiments, the first microinverter 104 and the second microinverter 108 can be in an apparatus that is separate from the photovoltaic module 100.

While the photovoltaic module 100 is shown as including two microinverters connected in parallel, it is to be understood that the number of microinverters included in the photovoltaic module 100 can be greater than two. For example, if the photovoltaic module 100 comprises eight separate sub-modules, for example, then the photovoltaic module 100 may include eight microinverters that respectively correspond to the eight sub-modules, and wherein the eight microinverters are electrically connected in parallel with one another.

In another exemplary embodiment, the first microinverter 104 and the second microinverter 108 can be interleaved. The interleaving of the first microinverter 104 and the second microinverter 108 can result in substantial cancellation of the current ripple of the individual inverters 104 and 108, while the fundamental component of each waveform output by the respective microinverters 104 and 108 are constructively reinforced when summed. In such an exemplary embodiment, the microinverters 104 and 108 can be single-phase inverters, three-phase inverters, or some other poly-phase inverters. Additionally, when multiple microinverters are connected in parallel in the photovoltaic module 100, power rating of such microinverters can be reduced. For example, the power rating of the microinverters 104 and 108 can be between 15 W and 30 W. In contrast, if a single microinverter is employed to interface the photovoltaic module 100 with the AC grid, the power rating of such microinverter can be between 150 W and 300 W.

Figure 2:
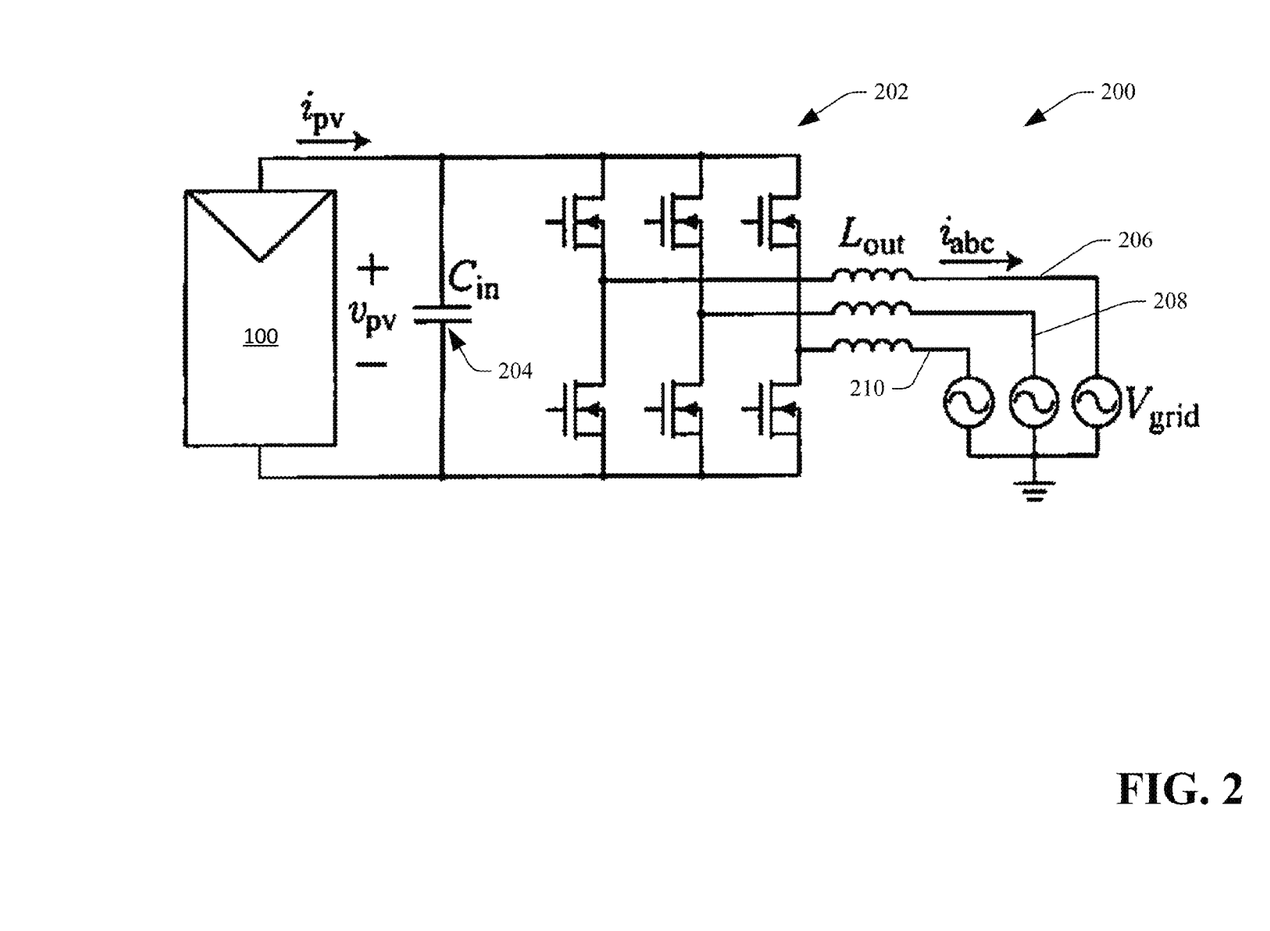
FIG. 2 is a schematic diagram of an exemplary microinverter.

With reference now to FIG. 2, a schematic diagram of a microinverter 200, which can be the first microinverter 104 and/or the second microinverter 108, is illustrated. As shown in FIG. 2, the microinverter 200 is shown as being connected to the photovoltaic module 100, rather than connected to a sub-module of the photovoltaic module 100. It is to be understood, however, that the microinverter 200 can be coupled to a single solar cell, a string of series-connected solar cells, series connected sub-modules of the photovoltaic module 100, a single sub-module of the photovoltaic module 100, etc.

The microinverter 200 comprises a plurality of transistors 202 that are electrically connected to the photovoltaic module 100 by way of a DC link. The DC link has a capacitor 204, which represents DC link capacitance. Such capacitance can be between 100 nF and 5 g. In an exemplary embodiment, the capacitance of the DC link can be 200 nF. The capacitor 204 is employed to buffer the photovoltaic module 100 from switching transients and maintain a small module voltage ripple. The aforementioned capacitance of 200 nF was selected via simulation to cause ripple losses to be less than 0.25% at a rated power of 200 W. It can therefore be ascertained that the capacitance of the capacitor 204 can be selected based on a threshold of acceptable ripple losses. For the microinverter 200 to be operational, the DC link voltage $v_{pv}$, must always exceed the peak AC voltage.

The microinverter 300 comprises three phase legs 206-210 that are coupled to the AC grid. Each of the phase legs 206-210 has an inductance between 4 mH and 10 mH. In an exemplary embodiment, each of the phase legs 206-210 can have an inductance of 6 mH.

Maximum power point tracking can be employed in connection with controlling the microinverter 200. A maximum power point tracker can be employed in connection with generating a voltage command for the photovoltaic module 100. A PI controller can be employed to ensure that the voltage of the photovoltaic module 100 is driven to the voltage commanded by the maximum power point tracker by altering the magnitude of the phase current command, which controls current generated by the photovoltaic module 100. A voltage with respect to neutral can be determined through a phase-locked loop. In general, the current output by the photovoltaic module 100, the voltage of the photovoltaic module 100, a neutral voltage, and current of the three phase legs 206-210, can be monitored and employed in connection with outputting signals for a pulse width modulator to control the plurality of transistors 202. The overall function of the control system is to increase the output current when the voltage of the photovoltaic module 100 is above the module maximum power point and decrease the output current when the voltage of the photovoltaic module 100 is below the module maximum power point.

Figure 3:
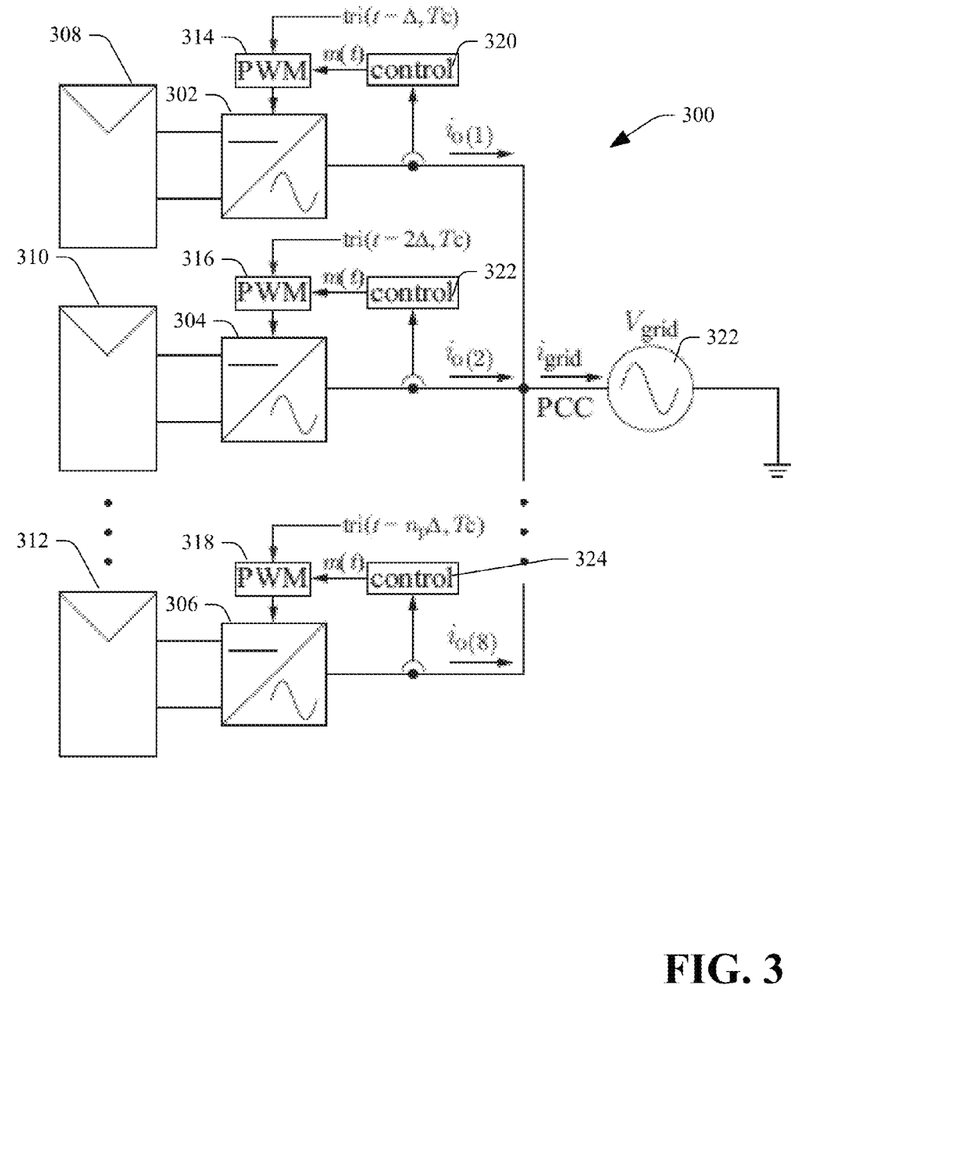
FIG. 3 is an exemplary illustration of a plurality of interleaved microinverters.

Now referring to FIG. 3, a system 300 of interleaved microinverters that can be associated with the photovoltaic module 100 is illustrated. An interleaved set of n triangular waveforms with period $T_C$ can be generated by introducing specified amounts of time delay between each of the multiple waveforms. Specifically, each waveform can be delayed by a unique multiple of Δ, where Δ=$T_C$/n. Generally, any number of interleaved triangular waveforms greater than one sums to a smaller magnitude than the magnitude of the constituent waveform. It can therefore be concluded that if interleaved triangular waveforms are superimposed on any set of other waveforms, such as sine waves, and summed, the net signal contains the non-triangular portions of the original signals and the triangle ripple is attenuated.

FIG. 3 illustrates multiple microinverters 302-306 arranged electrically in parallel, wherein interleaved carrier pulse width modulation is used. The system 300 comprises a plurality of photovoltaic modules 308-312, wherein the microinverters 302-306 are respectively connected to the photovoltaic modules 308-312. In another exemplary embodiment, the photovoltaic modules 308-312 can be sub-modules of a photovoltaic module, and the microinverters 302-306 can be integrated into the photovoltaic module. In the configuration shown in FIG. 3, the microinverters 302-306 can be single-phase, three-phase, or other poly-phase inverters. Further, it can be noted that the source of energy can be altered. For example, the plurality of inverters 302-306 can be employed in connection with conventional photovoltaic systems, batteries, fuel cells, rectified AC power sources, and the like.

In an exemplary embodiment, the triangular carrier waveforms are interleaved such that each carrier is delayed by a unique multiple of A, which can be defined as follows:

$$\Delta \equiv \frac{T_C}{n_p} \quad (1)$$

where $T_C$ is the carrier waveform period and $n_p$ is the number of parallel inverters. The interleaved carrier waveforms have the effect of causing the switch timing among the inverters to be interleaved such that the ripple is also interleaved. Using this method, the interleaved nature of pulse width modulator (PWM) carrier signals is propagated to the final output current ripple. It can be noted that sawtooth or other types of carrier waveforms can also be implemented, so long as the switch timing among the inverters 302-306 is interleaved.

The inductance on any phase legs of the microinverters 302-306 can be between 200 μH and 1 mH. In an exemplary embodiment, the inductance can be 800 μH. The system 300 further comprises a plurality of pulse width modulators 314-318 that are respectively controlled by control systems 320-324. As indicated above, the control systems 320-324 control the pulse width modulators 314-318 such that the switch timing among the microinverters 302-306 is interleaved. In such an exemplary embodiment, the power rating of each of the microinverters can be relatively low, such as between 15 W and 30 W. Additionally, it can be noted that in an MEPV module, because of the relatively low current that flows through each microinverter and because conduction losses are proportional to the current squared, high resistances can be tolerated while keeping conduction losses low. Specifically, an exemplary maximum allowable total resistance within one phase branch of a three-phase integrated inverter, $R_{br(max)}$, while maintaining conduction losses below 1.5%, can be estimated as follows:

$$R_{br(max)} \approx \frac{0.015 \, V_{LL}^2}{P_{rated}} \quad (2)$$

where $P_{rated}$ is the power rating of the individual integrated circuit microinverter. For instance, a 200 W MEPV module can be outfitted with eight 25 W, interleaved integrated circuit microinverters. Utilizing the equation set forth above, with $P_{rated}$=25 W while connected to a 208 V or 480 V system, gives 26 ohms and 139 ohms, respectively.

The system 300 further comprises at least one voltage source, wherein a number of voltage sources is equivalent to a number of AC phases. Further, connections from the inverters 302-306 are illustrated as single wires; it is to be understood, however, that a number of wires exiting the inverters 302-306 is equivalent to a number of AC phases.

Figure 4:
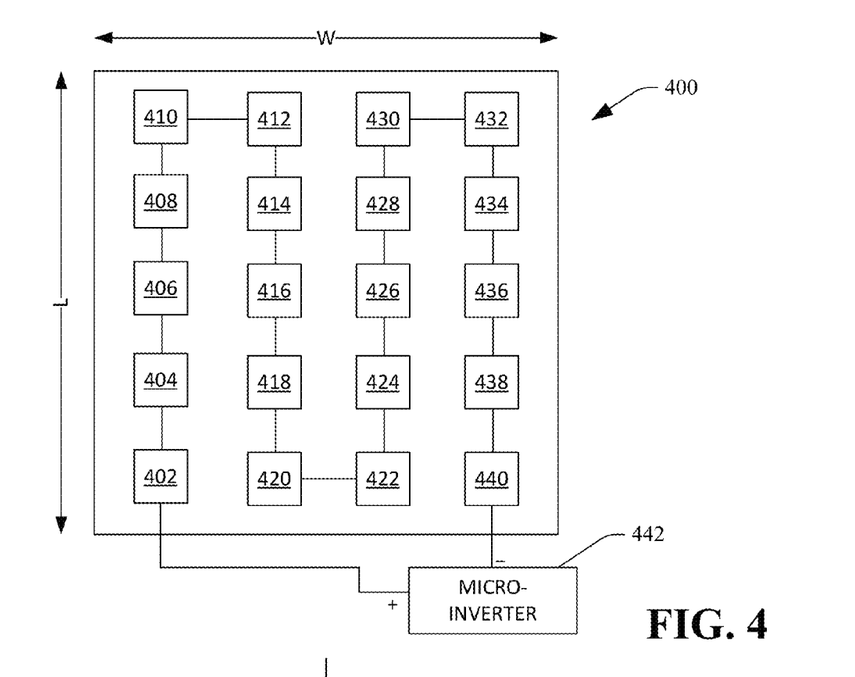
FIG. 4 illustrates an exemplary sub-module of a photovoltaic module.

Now referring to FIG. 4, an exemplary photovoltaic sub-module 400 that can be included in the photovoltaic module 100 is illustrated. Pursuant to an example, size of the photovoltaic sub-module 400 can be between 10 cm and 30 cm in length and between 10 cm and 30 cm in width. The photovoltaic sub-module 400 comprises a plurality of groups 402-440 of electrically connected photovoltaic cells, wherein the groups 402-440 are electrically connected in series. While the photovoltaic sub-module 400 is shown as including 20 groups, it is to be understood that a number and arrangement of groups in the photovoltaic sub-module 400 can depend upon a desired voltage output by the photovoltaic sub-module 400. Furthermore, while the photovoltaic sub-module 400 is shown as being a definable physical sub-element of the photovoltaic module 100, it should be understood that a photovoltaic sub-module can be defined by a circuit that is employed to connect cells in a solar panel. Both arrangements are intended to fall under the scope of the hereto appended claims.

Pursuant to an example, the photovoltaic sub-module 400 can comprise approximately 100 groups, wherein each of the groups is configured to output a consistent voltage, for example, approximately 2.4 V. In such example, the desired output of the photovoltaic sub-module 400 is approximately 240 V. Furthermore, as will be shown in an example herein, some of the groups may be connected in parallel. For instance, the photovoltaic sub-module 400 can comprise a first plurality of groups that are connected in series and a second plurality of groups are connected in series, wherein the first plurality of groups and the second plurality of groups are connected in parallel.

As shown, a microinverter 442, such as the first microinverter 104 or the second microinverter 108, is connected to the sub-module by way of groups 402 and 440, respectively. While shown as being separate from the sub-module 400, it is to be understood that the microinverter 442 can be integrated in the sub-module 400. Furthermore, as the photovoltaic module 100 comprises a plurality of such groups, a plurality of microinverters can be independently coupled to a respective plurality of groups, and such microinverters can subsequently be electrically connected in parallel.

Figure 5:
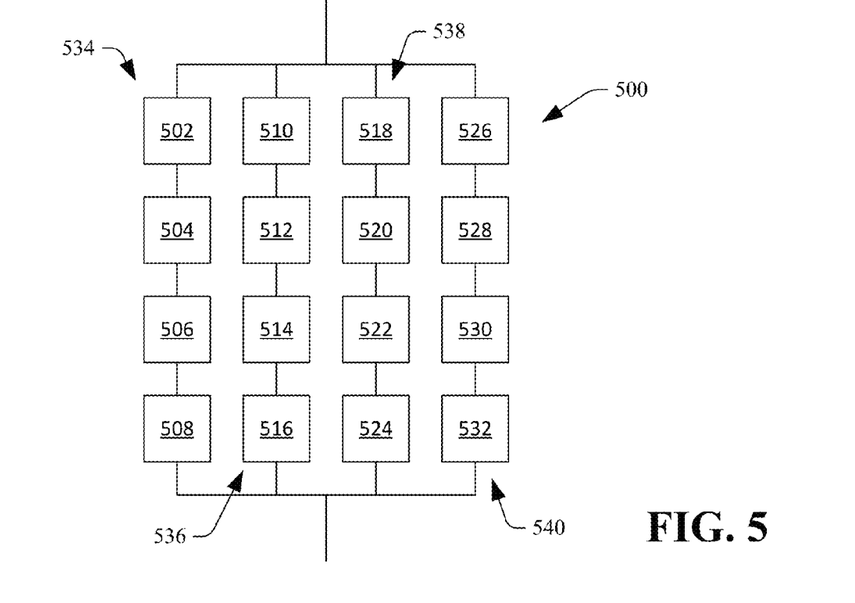
FIG. 5 illustrates an exemplary group of MEPV cells that can be included in a sub-module of a photovoltaic module.

Turning now to FIG. 5, an exemplary group 500 that can be included as one of the groups 402-440 in the photovoltaic sub-module 400 is illustrated. The group 500 comprises a plurality of photovoltaic cells 502-532. Pursuant to an example, the photovoltaic cells 502-532 can be MEPV cells. For example, the following references which are incorporated herein, by reference, described the building of photovoltaic modules that comprise numerous photovoltaic cells using micro-fabrication techniques: Nielson, et al., "Microscale C-SI (C) PV Cells for Low-Cost Power", 34$^{th}$ IEEE Photovoltaic Specialist Conference, June 7-10 2009, Philadelphia, Pa., 978-1-4244-2950/90, and Nielson, et al., "Microscale PV Cells for Concentrated PV Applications," 24$^{th}$ European Photovoltaic Solar Energy Conference, Sep. 21-25, 2009, Hamburg, Germany 3-936338-25-6.

Thus, as mentioned above, the photovoltaic cells 502-532 can be or include Si cells, GaAs cells, and InGaP cells. Therefore, it is to be understood that at least one of the photovoltaic cells 502-532 can be III-V photovoltaic cells. Additionally or alternatively, the photovoltaic cells 502-532 can include at least one Ge cell. Still further, the photovoltaic cells 502-532 can be, or can be included in multi junction cells that include layers of differing types of photovoltaic cells with differing band gaps. As mentioned above, in an exemplary embodiment, each layer of the multi junction cell can be independently contacted. In another example, a multi junction cell may be contacted at one position, such that voltages of the cells in the multi junction cell are series generated voltages. Thus, in an exemplary embodiment, each of the photovoltaic cells 502-532 can be multi junction cells, wherein for each multi junction cell, layers are integrally connected. This effectively creates a string of photovoltaic cells electrically connected in series in a relatively small amount of space.

In an exemplary embodiment, the group 500 can comprise a first string of photovoltaic cells 534, a second string of photovoltaic cells 536, a third string of photovoltaic cells 538, and a fourth string of photovoltaic cells 540. The first string of photovoltaic cells 534 comprises the photovoltaic cells 502-508 electrically connected in series. Similarly, the second string of photovoltaic cells 536 comprises photovoltaic cells 510-516 electrically connected in series. The third string of photovoltaic cells 538 comprises the photovoltaic cells 518-524 electrically connected in series, and the fourth string of photovoltaic cells 540 comprises the photovoltaic cells 526-532 electrically connected in series. The first string of photovoltaic cells 534, the second string of photovoltaic cells 536, the third string of photovoltaic cells 538, and the fourth string of photovoltaic cells 540 are electrically connected in parallel.

As will be understood by one skilled in the art, different types of photovoltaic cells have different operating voltages. For instance, if the photovoltaic cells 502-532 are Ge cells, the operating voltage may be approximately 0.3 V. If the photovoltaic cells 502-532 are Si cells, then the operating voltage can be approximately 0.6 V. If the photovoltaic cells 502-532 are GaAs cells, then the operating voltage may be approximately 0.9 V, and if the photovoltaic cells 502-532 are InGaP cells, then the operating voltage may be approximately 1.3 V. Pursuant to an example, the photovoltaic cells 502-532 can be Si cells. In such an example, each of the strings of photovoltaic cells 534-540 outputs approximately 2.4 V (a common voltage), and therefore, the group of photovoltaic cells 500 is configured to output approximately 2.4 V. In this case, strings 534, 536, 538, and 540 have different numbers of cells for the different cell types approximating the common voltage. For example, in an exemplary embodiment, the first strings of photovoltaic cells 534 can include eight Ge cells, the second string of photovoltaic cells 536 can include four Si cells, the third string of photovoltaic cells 538 can include three GaAs cells, and the fourth string of photovoltaic cells can include two InGaP cells. Slight voltage mismatch is tolerable, and if desired, a larger number of cells, and a higher voltage, can be used to provide more precise voltage matching. Additionally, power management circuitry can be used independently boost voltages generated by the series connections of different cell types to a common voltage. If the desired output of the photovoltaic module 100 is approximately 240 V, then the photovoltaic sub-module 400 can include 100 of the groups 500 electrically connected in series. Thus, each sub-module in the photovoltaic module 100 can output approximately 240 V and the output of the photovoltaic module 100 is thus approximately 240 V. It will be recognized that the configuration of cells, groups, and sub-modules can be arranged to obtain a desired output voltage.

Continuing with the example set forth above, the photovoltaic module 100 can include 38,400 cells. When an entirety of the photovoltaic module 100 is illuminated with solar radiation, the photovoltaic cells 502-532, in each of the groups, generate approximately 4 mW of electric power.

Figure 6:
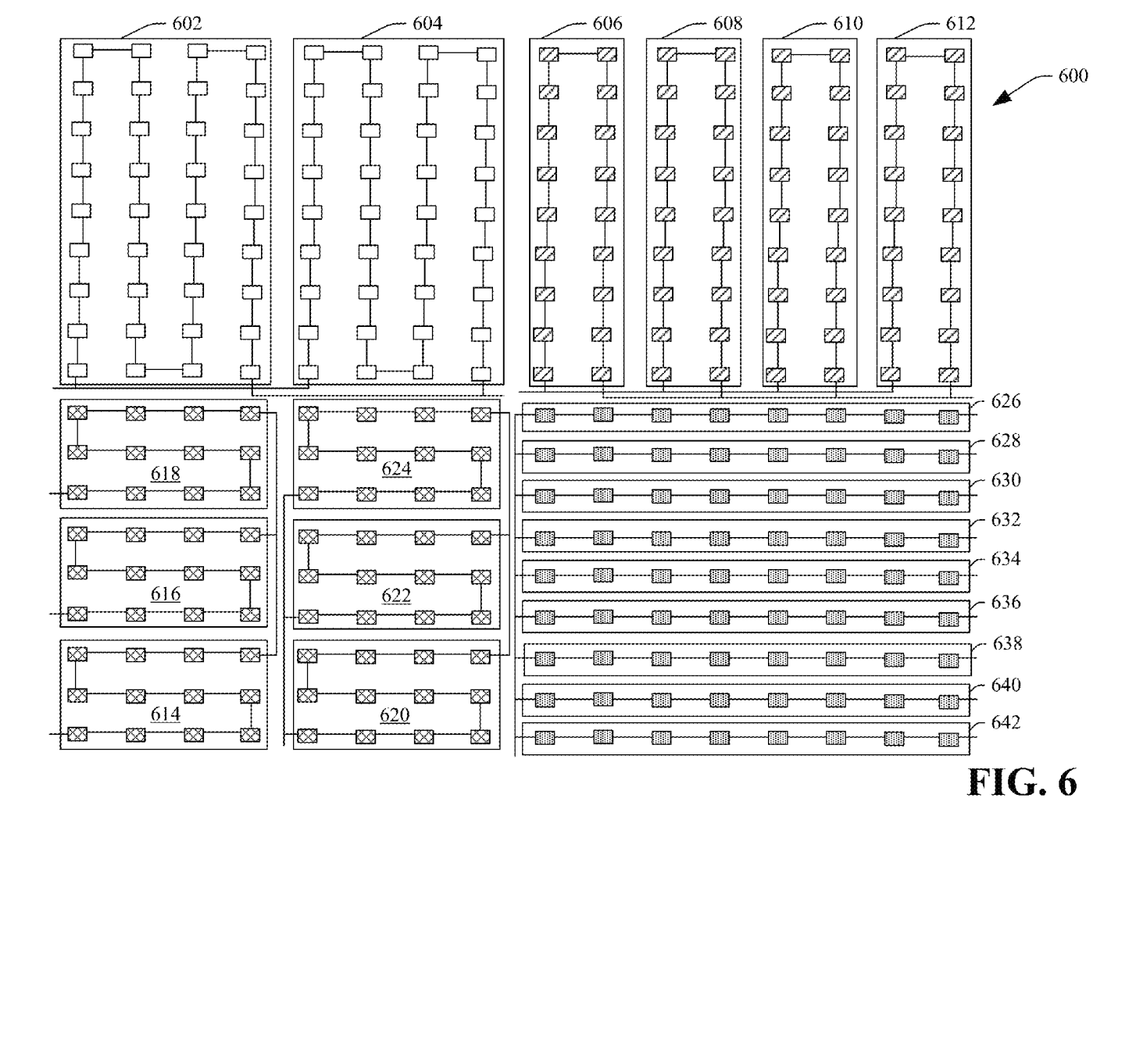
FIG. 6 illustrates an exemplary sub-module of a photovoltaic module.

With reference now to FIG. 6, an exemplary photovoltaic sub-module 600 that can be included as one of the photovoltaic sub-modules in the photovoltaic module 100 is illustrated. Pursuant to an example, the photovoltaic sub-module 600 can comprise a plurality of multi junction photovoltaic cells, such that each multi junction photovoltaic cell comprises a plurality of photovoltaic cells. As discussed above, each multi junction photovoltaic cell can comprise a Si photovoltaic cell and a III-V photovoltaic cell. In a more specific example, each multi junction photovoltaic cell can comprise a Ge photovoltaic cell, a Si photovoltaic cell, a GaAs photovoltaic cell, and an InGaP photovoltaic cell.

The exemplary photovoltaic sub-module 600 comprises 72 multi junction photovoltaic cells, wherein each of the multi-junction photovoltaic cells comprises a Ge cell, a Si cell, a GaAs cell, and an InGaP cell. These different cells are shown as laid out adjacent to one another; however, such layout is for purposes of explanation. As indicated above, the cells in the multi-junction cells are stacked on top of one another. In another exemplary embodiment, cells can be placed in a side-by-side configuration (e.g. if spectrum spreading optics are used).

The photovoltaic module 600 comprises different numbers of each cell type connected in series (to create a string) to arrive at similar intermediate (higher) voltages. These strings can be connected in parallel to effectively add currents. In an example, a desired intermediate voltage output by the photovoltaic sub-module 600 can be approximately 10 V. As discussed above, a Ge cell may have an operating voltage of approximately 0.3 V, a Si cell may have an operating voltage of approximately 0.6 V, a GaAs cell may have an operating voltage of approximately 0.9 V, and an InGaP cell may have an operating voltage of approximately 1.3 V. Therefore, the photovoltaic sub-module 600 can comprise a first string of Ge cells 602 and a second string of Ge cells 604 that each comprises 36 cells electrically connected in series. Accordingly, each of the first string of Ge cells 602 and the second string of Ge cell 604 outputs approximately 10.8 V. Further, while not shown, a first microinverter can be connected to the parallel combination of the first string of Ge cells 602 and the second string of Ge cells 604.

The exemplary photovoltaic sub-module 600 further comprises a first string of Si cells 606, a second string of Si cells 608, a third string of Si cells 610, and a fourth string of Si cells 612. Each of the strings of Si cells 606-612 can comprise 18 cells electrically connected in series resulting in each string outputting approximately 10.8 V. As mentioned above, a microinverter can be electrically connected to the parallel combination of the strings of Si cells.

The sub-module 600 can additionally comprise a first string of GaAs cells 614, a second string of GaAs cells 616, a third string of GaAs cells 618, a fourth string of GaAs cells 620, a fifth string of GaAs cells 622 and a sixth string of GaAs cells 624. Each of the strings of GaAs cells 614-624 can comprise 12 cells electrically connected in series resulting in each string of GaAs cells outputting approximately 10.8 V. Similar to what has been described above, the parallel combination of the strings of GaAs cells 414-424 can have a microinverter electrically connected thereto.

Further, the sub-module 600 can also comprise a first string of InGaP cells 626, a second string of InGaP cells 628, a third string of InGaP cells 630, a fourth string of InGaP cells 632, a fifth string of InGaP cells 634, a sixth string of InGaP cells 636, a seventh string of InGaP cells 638, an eighth string of InGaP cells 640, and a ninth string of InGaP cells 642. Each of the strings of InGaP cells 426-442 can comprise eight cells electrically connected in series, resulting in each string of InGaP cells outputting approximately 10.4 V. Again, at least one microinverter can be connected to a parallel combination of InGaP cells. The micro-inverters respectively coupled to the strings of different cell types can then be connected in parallel, for example, in an interleaved fashion.

From the above, it can be ascertained that an intermediate operating voltage for each string of cells can be approximately 10 V. It can further be ascertained that voltages output by strings of different cell types are not identical, and thus, the voltage output by the sub-module 600 will be the lowest voltage output by the string of cells.

Because only one type of cell is initially connected in series, power output from other cells in the sub-module is relatively unaffected by spectral shifts that cause a decrease in output of one type of cell versus another.

Figure 7:
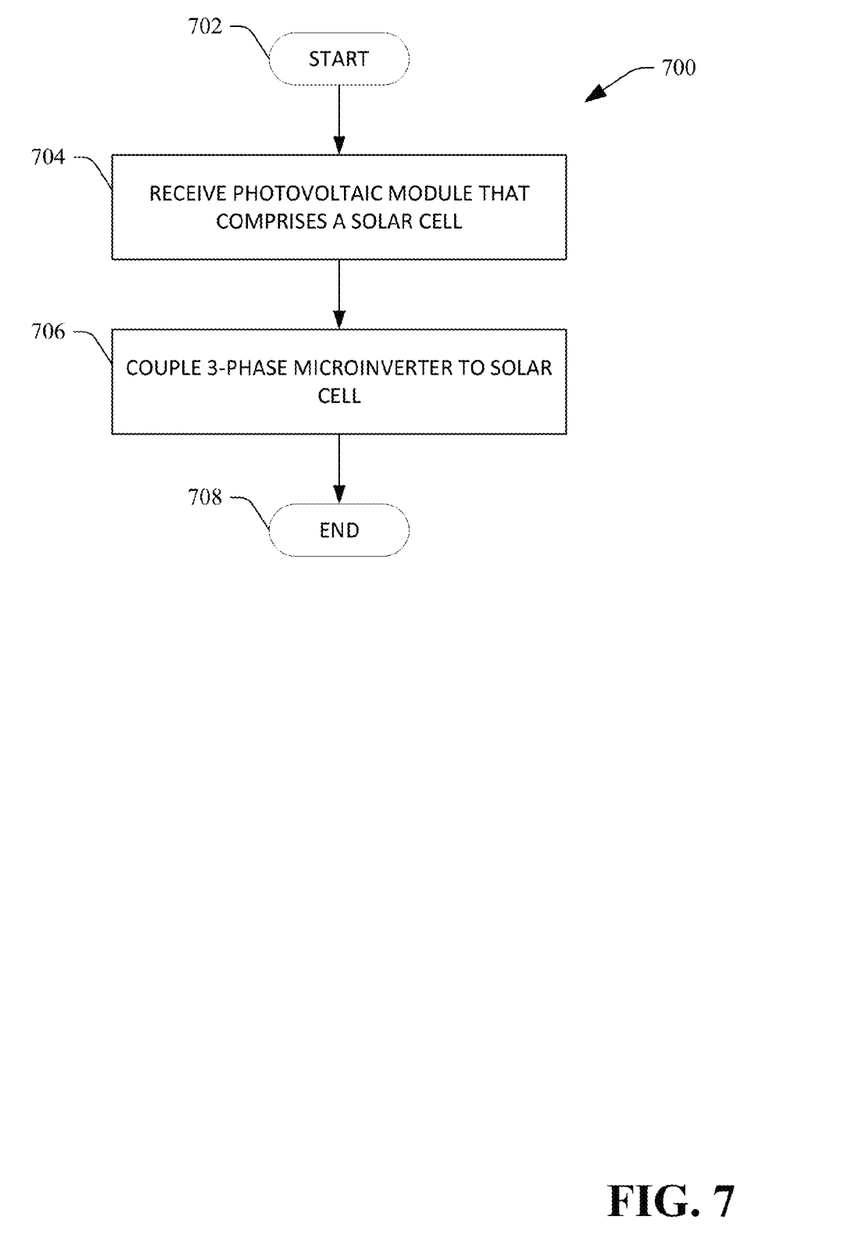
FIG. 7 is a flow diagram that illustrates an exemplary methodology for including a three-phase microinverter in a photovoltaic module.
Figure 8:
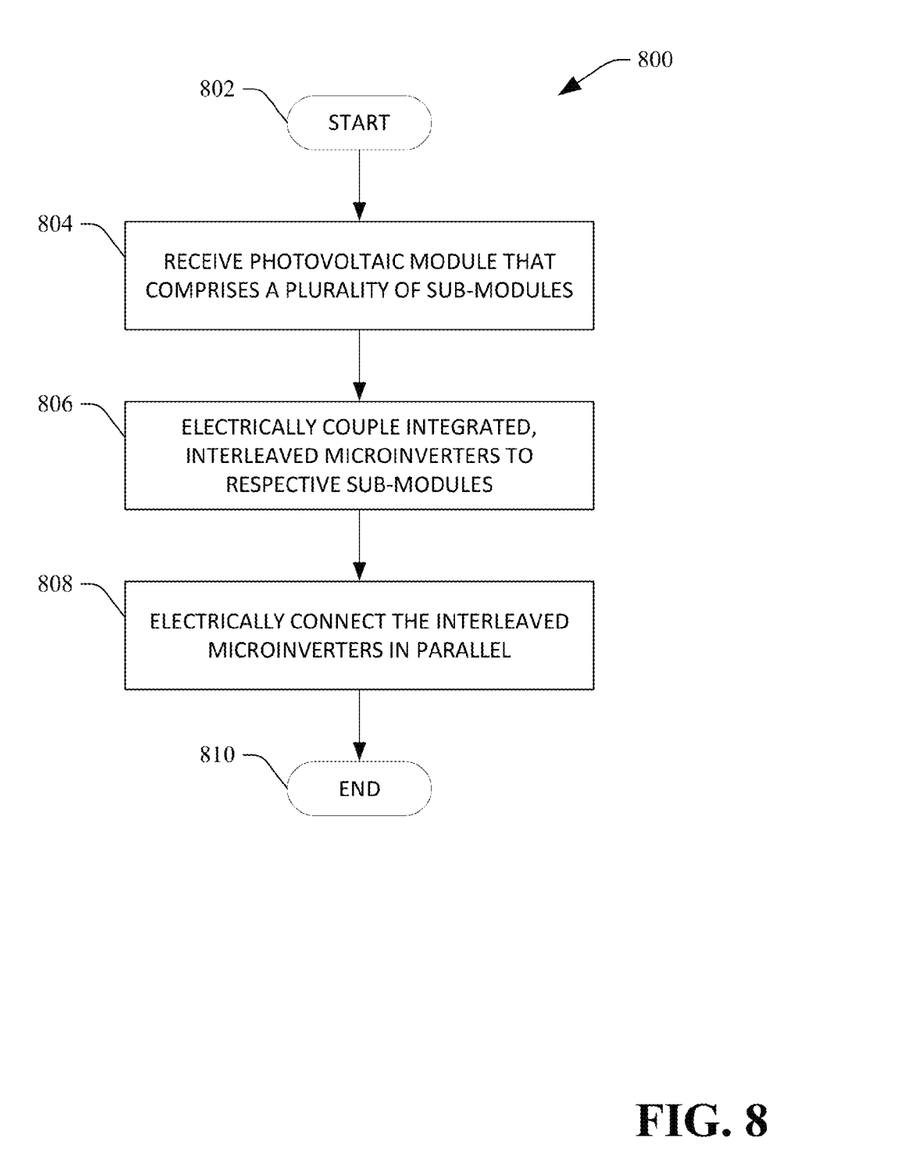
FIG. 8 is a flow diagram that illustrates an exemplary methodology for generating a photovoltaic module that comprises a plurality of interleaved microinverters.

With reference now to FIGS. 7-8, exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

With reference solely to FIG. 7, an exemplary methodology 700 for including a three-phase microinverter in a photovoltaic module is illustrated. The methodology 700 starts at 702, and at 704, a photovoltaic module that comprises a solar cell is received. At 706, a three-phase microinverter is electrically coupled to the solar cell, thereby causing energy generated by the solar cell, when irradiated with solar radiation, to be converted from direct current to three-phase alternating current. As mentioned above, the microinverter can be an integrated circuit that is integrated directly into the photovoltaic module with the solar cell. The methodology 700 completes at 708.

With reference now to FIG. 8, an exemplary methodology 800 that facilitates utilizing interleaved microinverters in a photovoltaic module is illustrated. The methodology 800 starts at 802, and at 804, a photovoltaic module that comprises a plurality of sub-modules is received. Such sub-modules can include, for instance, a plurality of MEPV cells that are electrically connected in series. Additionally, a sub-module can include groups of MEPV cells that are electrically connected in series.

At 806, integrated interleaved microinverters are electrically coupled to respective sub-modules. Therefore, for example, each sub-module can have a microinverter electrically connected thereto, and the microinverters can be controlled such that they are interleaved. At 808, the interleaved microinverters are connected in parallel such that the output of the photovoltaic module is the output of a plurality of parallel interleaved inverters. The methodology 800 completes at 810.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A solar power system, comprising:
    a photovoltaic module, the photovoltaic module comprising:
        a first solar cell that is configured to generate first direct current output;
        a second solar cell that is configured to generate second direct current output;
        a first microinverter that is electrically coupled to the first solar cell, the first microinverter converting the first direct current output generated by the first solar cell to first three-phase alternating current output; and a second microinverter that is electrically coupled to the second solar cell, the second microinverter converting the second direct current output generated by the second solar cell to second three-phase alternating current output, the first microinverter and the second microinverter being electrically connected in parallel, and the first microinverter and the second microinverter being interleaved.

2. The solar power system of claim 1, the first microinverter comprising a first direct current link, the second microinverter comprising a second direct current link, the first direct current link and the second direct current link each having a capacitance of less than 500 nF.

3. The solar power system of claim 1, wherein operating voltage of each of the first solar cell and the second solar cell is between 0.3 volts and 3 volts.

4. The solar power system of claim 1, the first microinverter and the second microinverter each comprising three respective phase legs, wherein each phase leg has an inductance of less than 8 mH.

5. The solar power system of claim 1, wherein the first microinverter and the second microinverter are integrated in the photovoltaic module with the first solar cell and the second solar cell.

6. The solar power system of claim 1, wherein the photovoltaic module comprises a first plurality of solar cells electrically connected in series and a second plurality of solar cells electrically connected in series, wherein the first plurality of solar cells comprises the first solar cell and the second plurality of solar cells comprises the second solar cell.

7. The solar power system of claim 1, wherein the first solar cell and the second solar cell are micro-system enabled photovoltaic (MEPV) cells, wherein a MEPV cell has a diameter of less than 2 mm and a thickness of less than 1000 μm.

8. The solar power system of claim 7, wherein the first solar cell and the second solar cell comprise a multi junction cell.

9. The solar power system of claim 7, wherein the first solar cell is a GaAs cell and wherein the second solar cell is a Si cell.

10. The solar power system of claim 1, the first microinverter and the second microinverter having a power rating of between 15 W and 30 W.

11. A photovoltaic module, comprising:
a first solar cell that outputs first direct current output responsive to receiving solar radiation;
a first microinverter that is coupled to the first solar cell, the first microinverter configured to convert the first direct current output to first alternating current output;
a second solar cell that outputs second direct current output responsive to receiving solar radiation; and
a second microinverter that is coupled to the second solar cell, the second microinverter configured to convert the second direct current output to second alternating current, wherein the first microinverter is electrically connected in parallel with the second microinverter, and wherein the first microinverter and the second microinverter are configured to respectively output the first alternating current output and the second alternating current output in an interleaved fashion.

12. The photovoltaic module of claim 11, wherein the first microinverter and the second microinverter are single phase inverters.

13. The photovoltaic module of claim 11, wherein the first microinverter and the second microinverter are poly-phase inverters.

14. The photovoltaic module of claim 11, wherein the first solar cell and the second solar cell are MEPV cells.

15. The photovoltaic module of claim 11, wherein the first microinverter and the second microinverter are integrated circuits.

16. The photovoltaic module of claim 11, wherein the first solar cell is a Si cell, and wherein the second solar cell is a GaAs cell.

17. The photovoltaic module of claim 11, wherein the first microinverter and the second microinverter respectively comprise three output phase legs, and wherein inductances of each of the three output phase legs of each of the first microinverter and the second microinverter is less than 1 mH.

18. The photovoltaic module of claim 11, further comprising a plurality of sub-modules, each sub-module comprising a respective plurality of solar cells and a respective microinverter that is electrically coupled to the respective plurality of solar cells, and wherein microinverters of the plurality of sub-modules are electrically connected in parallel.

19. The photovoltaic module of claim 11, wherein the first microinverter and the second microinverter have a power rating of between 15 W and 30 W.

20. A solar power system installation, comprising:
a photovoltaic module, the photovoltaic module comprising:
a first MEPV cell that outputs first direct current output responsive to receiving solar radiation;
a first microinverter that is coupled to the first MEPV cell, the first microinverter configured to convert the first direct current output to first three-phase alternating current output;
a second MEPV cell that outputs second direct current output responsive to receiving solar radiation; and
a second microinverter that is coupled to the second MEPV cell, the second microinverter configured to convert the second direct current output to second three-phase alternating current, wherein the first microinverter is electrically connected in parallel with the second microinverter, and wherein the first microinverter and the second microinverter are configured to respectively output the first alternating current output and the second alternating current output in an interleaved fashion.

* * * * *